Nov. 8, 1966     J. E. TRAFFORD ETAL     3,283,482
FUEL CONDITIONING SYSTEM FOR INTERNAL COMBUSTION ENGINES
Filed March 15, 1965
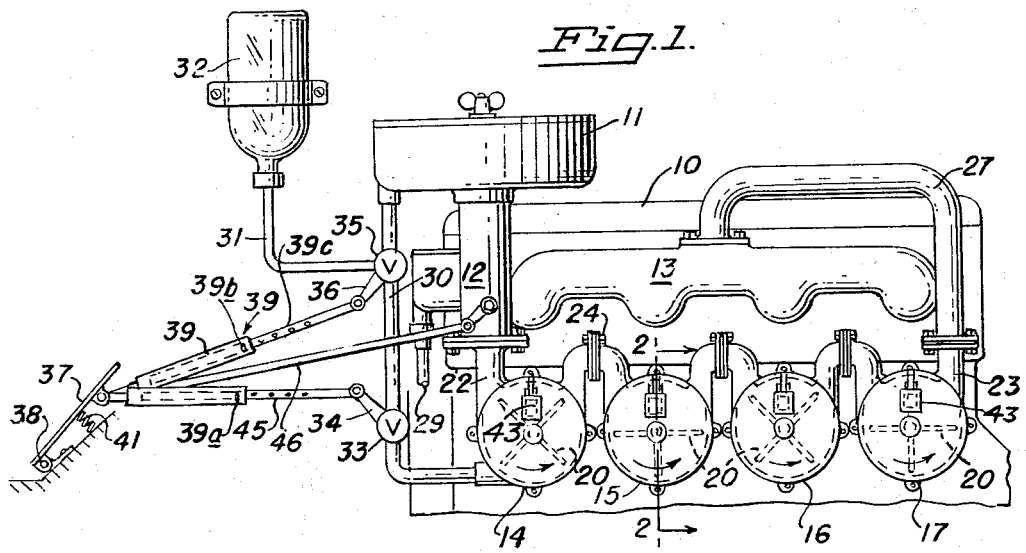
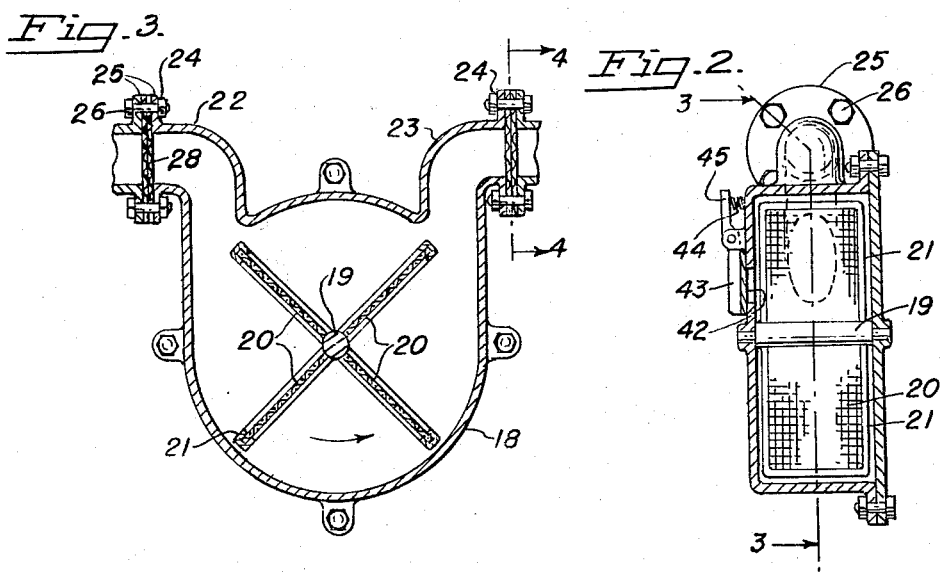
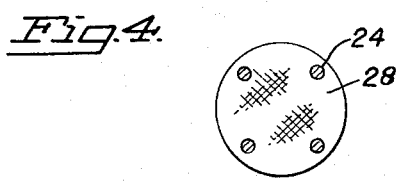
INVENTORS
LEROY KREEGER
JAMES E. TRAFFORD
BY J E Trafford
ATTORNEY

United States Patent Office 3,283,482
Patented Nov. 8, 1966

3,283,482
FUEL CONDITIONING SYSTEM FOR INTERNAL COMBUSTION ENGINES
James E. Trafford, Traveler's Hotel, and Leroy Kreeger, 1273 N. Main St., both of Salinas, Calif.
Filed Mar. 15, 1965, Ser. No. 439,873
2 Claims. (Cl. 55—385)

This invention relates to internal combustion engines, and more particularly to a novel system for conditioning fuel delivered to an engine, whereby the engine's efficiency may be increased through a more complete utilization of the power transmitting properties of the fuel.

One of the important objects of our invention is to provide an improved system for thoroughly vaporizing liquid fuel delivered to an internal combustion engine, thereby making possible a substantially complete burning of such fuel to the end that the efficiency of the engine may be increased and the unburned residue may be reduced to a minimum to avoid the creation of a smog condition.

Another object of our invention is to provide an improved fuel conditioning system for internal combustion engines which is capable of producing a vaporized fuel mixture containing suitable proportions of moisture, air and gasoline to increase the engine's efficiency.

Other and further objects of our invention will be specifically pointed out or will become apparent upon an understanding of the following specification. It is to be understood that the embodiment of our invention shown and described herein is for purposes of illustration only and that it is not to be considered exhaustive of the variations of the invention in the art.

In the accompanying drawing:

FIG. 1 is a diagrammatic side elevation of an internal combustion engine equipped with our improved fuel conditioning system;

FIG. 2 is an enlarged sectional view taken on the line 2—2 of FIG. 1;

FIG. 3 is a sectional view taken on the line 3—3 of FIG. 2; and

FIG. 4 is a sectional view taken on the line 4—4 of FIG. 3.

Referring to the drawing, a conventional internal combustion engine 10 is shown as having an air filter 11, a carburetor 12 and an intake manifold 13.

Suitably mounted adjacent a side of the engine are four fuel vaporizing units 14, 15, 16 and 17, which are somewhat tangentially connected one to another. As shown in FIGS. 2 and 3, each of the fuel vaporizing units comprises a housing 18 having a hub 19 journaled therein. Secured to the hub are radially disposed screenlike fuel vaporizing vanes 20 having a multiplicity of small openings therethrough. The fuel vaporizing vanes 20 have rigid supporting frames 21 which are secured to the hub 19. Each vaporizing unit has a tubular fuel inlet 22 and a tubular fuel outlet 23, and suitable union means 24 comprising annular flanges 25 and bolts 26 connects the outlet of 14 with the inlet of 15, the outlet of 15 with the inlet of 16 and the outlet of 16 with the inlet of 17. The outlet 23 of 17 is connected by union means 24 to a pipe 27 which connects centrally with the fuel intake manifold 13 of the engine. The inlet 22 of the vaporizing unit 14 is suitably connected to the carburetor 12 of the engine. Each of the union means 24 is equipped, preferably, with screens 28 which are provided as precautionary means to avoid possible backfiring which might ignite the fuel in one or more of the vaporizing units and thereby cause damage to the fuel vaporizing system.

The carburetor 12 is connected in the usual manner to a source of liquid fuel supply by a conduit 29. Connecting the air filter 11 and the vaporizing unit 14 is an air line or conduit 30 which is adapted to supply air tangentially to the fuel vaporizing system while the engine is in operation. Suitably supported in an elevated position for the gravity feeding of water through a water line or conduit 31 to the air line 30 is a vessel 32 holding a supply of water. A suitable control valve 33 is provided in the air line 30, such control valve having an operating arm 34 which is adapted to be actuated to turn the said valve to control the flow of air and moisture into the housing 18 of the vaporizing unit 14. A suitable control valve 35 is provided at the juncture of the air line 30 and the water line 31, such control valve having an operating arm 36 which is adapted to be actuated to turn the said valve to control the flow of water into the air line.

Suitably mounted for pivotal movement within reach of the foot of the driver of the vehicle on which the engine is supported is an inclined foot pedal 37 having a pivot pin 38 carried on its upper end portion. Connected at its ends to the pivot pin 38 and an end of the arm 36 is a connecting rod 39 which comprises two relatively adjustable portions consisting of a tubular section 39a within which is secured as by a cotter pin 39b a rod section 39c. The cotter pin 39b extends through a hole in the tubular section 39a and also through one of several spaced holes 39d in the rod section 39c to secure the said sections together, the length of the said connecting rod being determined by the particular hole 39d through which the cotter pin extends. Connecting the pin 38 of the foot pedal with an end of the arm 34 is a connecting rod 40 which embodies two connected sections that are relatively adjustable in the manner of the connecting rod 39 to vary its length. It will be noted that by pressing the foot pedal 37 downwardly, the arms 34 and 36 are actuated to turn their respective valves 33 and 35 to increase the flow of air through the air line 30 and the water through the water line in the said air line.

It is to be noted that FIG. 1 is intended to illustrate diagrammatically the present invention, it being understood that the relative positions of the various components may be changed if so desired.

When the engine is in operation, fuel from the carburetor 12 and air and a small amount of moisture from the air filter 11 and the water vessel 32 are drawn into the vaporizing unit 14 and directed tangentially against the outer portions of the vanes 20 to rotate such vanes in a counter-clockwise direction (FIG. 1). The fuel mixture passes from one vaporizing unit to another and finally enters the pipe 27 which then conveys it to the intake manifold of the engine. With the rotation of the vanes 20 of the vaporizing units, the liquid fuel particles are divided and subdivided by the action of screen-like vanes, thereby thoroughly mixing the air-fuel-water mixture to provide a vapor-like fuel which is highly combustible, and which when ignited in the engine is burned in substantially its entirety to give maximum efficiency to the engine's operation without leaving any substantial amount of unburned residue to promote a smog condition. When the speed of operation of the engine is to be increased, the foot pedal is pressed downwardly to increase the flow of fuel, air and water into the vaporizing unit 14, and as the suction provided by the engine is increased the vanes 20 of the various vaporizing units are rotated at increased speeds to maintain automatically the vaporized properties of the fuel mixture delivered to the engine.

A suitable spring 41 returns the foot pedal 37 to its normal, inoperative position when the downward pressure thereon is removed.

To relieve any outward pressure which might develop inside the fuel vaporizing units due to backfiring or premature explosions, each of the housings 18 is provided with an opening 42 in its side wall which is normally closed by a pivoted door 43 that is held in a closed position by a compression spring 44, such compression spring being under tension between an end flange 45 on such door and the said side of the housing. The door 43 is adapted to open automatically when a predetermined outward pressure builds up in the housing 18, thereby avoiding possible damage to the housing and other parts of the system.

Conventional means 46 connecting the foot pedal 37 and the carburetor 12 controls the flow of the fuel mixture into the vaporizing unit 14.

What we claim is:

1. In a fuel conditioning system for internal combustion engines of the type having a fuel intake manifold, an air filter and a carburetor, a plurality of fuel vaporizing units mounted adjacent the engine, the said units being connected one to another in series to allow a fuel mixture to flow successively through the units, each of the units having a housing enclosing a rotor, such rotor having a hub journaled in the housing and a plurality of radial screen-like vanes, each housing having a tangentially arranged fuel inlet and an outlet, the outlet of the housing of one vaporizing unit being connected to the inlet of the housing of an adjacent unit, the outlet of the housing of the vaporizing unit which is last in the series being connected to the engine's fuel intake manifold, an air line connecting the air filter and a tangentially arranged air intake means to the housing of the vaporizing unit which is first in the series, a water containing vessel having a water line connecting with the air line to supply water to the air line, a control valve in the air line, a control valve in the water line, a foot pedal pivotally mounted for operation by the driver of a vehicle driven by the engine, means connecting the foot pedal and the valves in the air and water lines to control the air and water admitted to the housing of the vaporizing unit which is first in the series, and a conduit connecting the carburetor and the housing of the last mentioned vaporizing unit.

2. In a fuel conditioning system for internal combustion engines of the type having a fuel intake manifold, an air filter, and a carburetor, a plurality of fuel vaporizing units mounted adjacent the engine, the said units being connected in series one to another to allow a fuel mixture to flow successively through the units, each of the units having a housing enclosing a rotor, such rotor having a hub journaled in the housing and a plurality of the radial screen-like vanes, each housing having a tangentially arranged fuel inlet and an outlet, the outlet of the housing of one vaporizing unit being connected to the fuel inlet of the housing of an adjacent unit, the outlet of the housing of the vaporizing unit which is last in the series being connected to the engine's fuel intake manifold, an air line connected tangentially to the housing of the vaporizing unit which is first in the series and to the air filter, a valve in the air line to control the flow of air through the said air line, manually operated means to control the valve in the air line, and a conduit connecting the carburetor and the housing of the last mentioned vaporizing unit.

References Cited by the Examiner

UNITED STATES PATENTS

| | | | |
|---|---|---|---|
| 969,941 | 9/1910 | Cox | 48—180 |
| 1,029,810 | 6/1912 | La Mont | 48—180 |
| 1,051,440 | 1/1913 | Ostler | 48—180 |
| 1,406,113 | 2/1922 | Van Voorhis et al. | 48—180 |
| 1,594,711 | 8/1926 | Chapman | 48—180 |
| 2,828,115 | 3/1958 | Register | 261—37 |
| 3,186,692 | 6/1965 | Moseley. | |

HARRY B. THORNTON, *Primary Examiner.*

RONALD R. WEAVER, *Examiner.*